United States Patent
Gailloux et al.

(10) Patent No.: US 8,270,944 B1
(45) Date of Patent: Sep. 18, 2012

(54) PRE-PAID ACCOUNT BALANCE NOTIFICATION

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 142 days.

(21) Appl. No.: 12/843,884

(22) Filed: Jul. 27, 2010

(51) Int. Cl.
*H04W 4/24* (2009.01)
*H04W 4/12* (2009.01)

(52) U.S. Cl. ............... 455/406; 455/466; 455/414.1

(58) Field of Classification Search .......... 455/405–409, 455/414.1, 432.1–433; 379/114.01–114.2, 379/130–141
See application file for complete search history.

(56) References Cited

U.S. PATENT DOCUMENTS

2004/0137874 A1* 7/2004 Veerepalli et al. ............ 455/405
2008/0057917 A1* 3/2008 Oria ........................... 455/414.1

* cited by examiner

*Primary Examiner* — Ajit Patel
*Assistant Examiner* — Erica Navar

(57) ABSTRACT

A method of informing a portable electronic device of a number of available pre-paid text messages, comprising billing a pre-paid subscriber account for a predetermined number of text messages to be sent by a portable electronic device; incrementing a first count by an application executing on a computer based on the predetermined number of text messages purchased; determining by the application a second count indicating a remaining balance of text messages based on how many text messages have been one of received and sent by the portable electronic device since billing the pre-paid subscriber account based on the first count; and sending by the application a message comprising the second count to the portable electronic device.

4 Claims, 7 Drawing Sheets

PRE-PAID ACCOUNT BALANCE NOTIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of portable electronic devices may communicate with one another by a number of different methods. One of the more popular methods is by short message service (SMS—also known as text messaging). This service may be offered by a communication service provider of portable electronic devices. Service providers may offer one or more of phone service, internet service, text messaging service, and/or other portable electronic device communication services, and may bundle more than one of these services. The bundle of services may be referred to as a service plan. The service plan may be provided as a post-pay billing system, such that a user is billed for services already provided. For example, a user may be billed at the end of a month for the services they have used in that month. Alternatively, services may be pre-paid, such that a user pays for an amount of service, which may be applied as a credit to the user's account. The user may then utilize the service until the amount of pre-paid service is consumed. Then, if desired, the user may buy additional service credit in a variety of increments or units. Text messaging, for example, may be purchased as a number of text messages to be sent or received by a portable electronic device. Subsequently, each time the user sends or receives a text message, a unit of the user's text credits is consumed, and the number of available text messages is decremented accordingly. At any given time, a user may want to know how many text message credits he/she has remaining in their account, in order to track and/or manage their text messaging budget. The user may contact the service provider by, for example, calling the service provider's customer service center or such.

SUMMARY

In an embodiment, a method of informing a portable electronic device of a number of available pre-paid text messages is disclosed. The method comprises billing a pre-paid subscriber account for a predetermined number of text messages to be sent by a portable electronic device, incrementing a first count by an application executing on a computer based on the predetermined number of text messages purchased, determining by the application a second count indicating a remaining balance of text messages based on how many text messages have been one of received and sent by the portable electronic device since billing the pre-paid subscriber account based on the first count, and sending by the application a message comprising the second count to the portable electronic device.

In an embodiment, a method of presenting on a portable electronic device a number of remaining available pre-paid text messages is disclosed. The method comprises receiving by the portable electronic device a text message, parsing the text message into a content portion and a count portion, presenting the content portion in a text message display frame, and presenting a number of remaining available pre-paid text messages based on the count portion of the text message.

In an embodiment, a method of presenting on a portable electronic device a number of remaining available pre-paid text messages is disclosed. The method comprises receiving by the portable electronic device a message indicating a number of remaining available pre-paid text messages, receiving a voice call by the portable electronic device, on termination of the voice call, presenting an audio message indicating the number of remaining available pre-paid text messages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
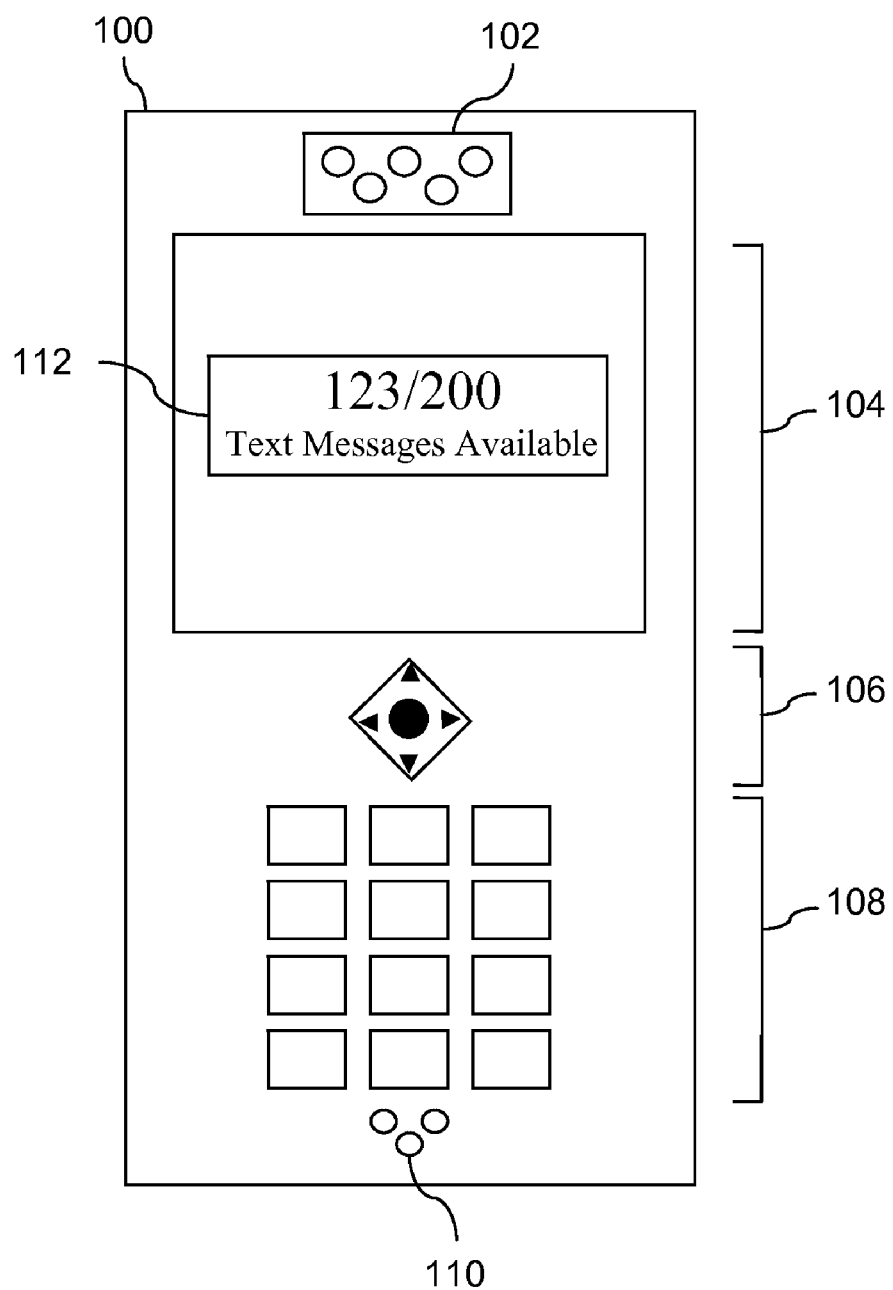
FIG. 1 illustrates a portable electronic device, according to an embodiment of the disclosure.

It should be understood at the outset that, although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches several methods of informing a user of a portable electronic device of her/his pre-paid account balance. The pre-paid account may include credits for text messaging, voice minutes, and/or units of any other mode of communication with a portable electronic device. The user may purchase a number of pre-paid units, such as text messages, pre-paid phone minutes, and/or other units for use on his/her portable electronic device from a communication service provider. As the units are consumed from the account, an account balance is communicated to the user by the service provider. The account balance may include a representation of the previous balance, that is to say, the number of units the user had when the account was either started or when the user last added to the account, along with the current balance. The balance may be presented in a variety of manners, including visual and audible, and may be presented as units consumed, units remaining, a fraction of units remaining or consumed, or other presentation that effectively conveys to the user the account balance.

Notification may be performed periodically, such as hourly, daily, weekly, or other unit of time. Alternatively, notification may be based on an increment of usage, such as every five text message credits used, every ten text messages used, every twenty-five text messages used, or other increment of usage of text message credits or other credits in a pre-paid account. Notification may be based on the amount of credit units remaining, for example, when there are twenty-five text messages left, ten text messages left, five text messages left, or other unit of text messages or other pre-paid credits left.

A client on the portable electronic device may perform one or more methods or processes that communicates with an application executing on a system of the service provider to determine the remaining service of the pre-paid account. The client may then present the information about the remaining service to the user of the portable electronic device. In addition, the client may be user-configurable in order to allow the user of the portable electronic device to configure the frequency of notification, the mode of notification, and/or other parameters of notification in order to permit the user to customize the notification operating parameters to suit his/her own needs and/or desires.

The automated notification of consumed and/or remaining pre-paid service may be a convenience for users and may promote a service provider setting itself apart from its competitors by offering this service. Further, the automated notification of consumed and/or remaining pre-paid service may reduce the costs associated with operating a customer support center by reducing the number of calls from subscribers who merely want to know the balance in their pre-paid accounts.

Now turning to FIG. 1, a portable electronic device 100 is illustrated. The portable electronic device 100 includes a speaker or earpiece 102, a display 104, a button, set of buttons, or touch-sensitive surface 106 for cursor movement or such on the display 104, another touch-sensitive surface and/or keys 108 for input by a user, and a microphone 110. The portable electronic device 100 may present options for the user to select, controls for the user to actuate, and/or cursors or other indicators for the user to direct. The portable electronic device 100 may further accept data entry from the user, including numbers to dial or various parameter values for configuring the operation of the handset. The portable electronic device 100 may further execute one or more software or firmware applications in response to user commands. These applications may configure the portable electronic device 100 to perform various customized functions in response to user interaction. Additionally, the portable electronic device 100 may be programmed and/or configured over-the-air, for example from a wireless base station, a wireless access point, or a peer portable electronic device 100. The portable electronic device 100 may present options for the user to select, controls for the user to actuate, and/or cursors or other indicators for the user to direct. The portable electronic device 100 may further accept data entry from the user, including numbers to dial or various parameter values for configuring the operation of the handset. The portable electronic device 100 may further execute one or more software or firmware applications in response to user commands. These applications may configure the portable electronic device 100 to perform various customized functions in response to user interaction. Additionally, the portable electronic device 100 may be programmed and/or configured over-the-air, for example from a wireless base station, a wireless access point, or a peer portable electronic device 100. FIG. 1 also depicts a message 112, which will be discussed in more detail hereinafter.

Figure 2:
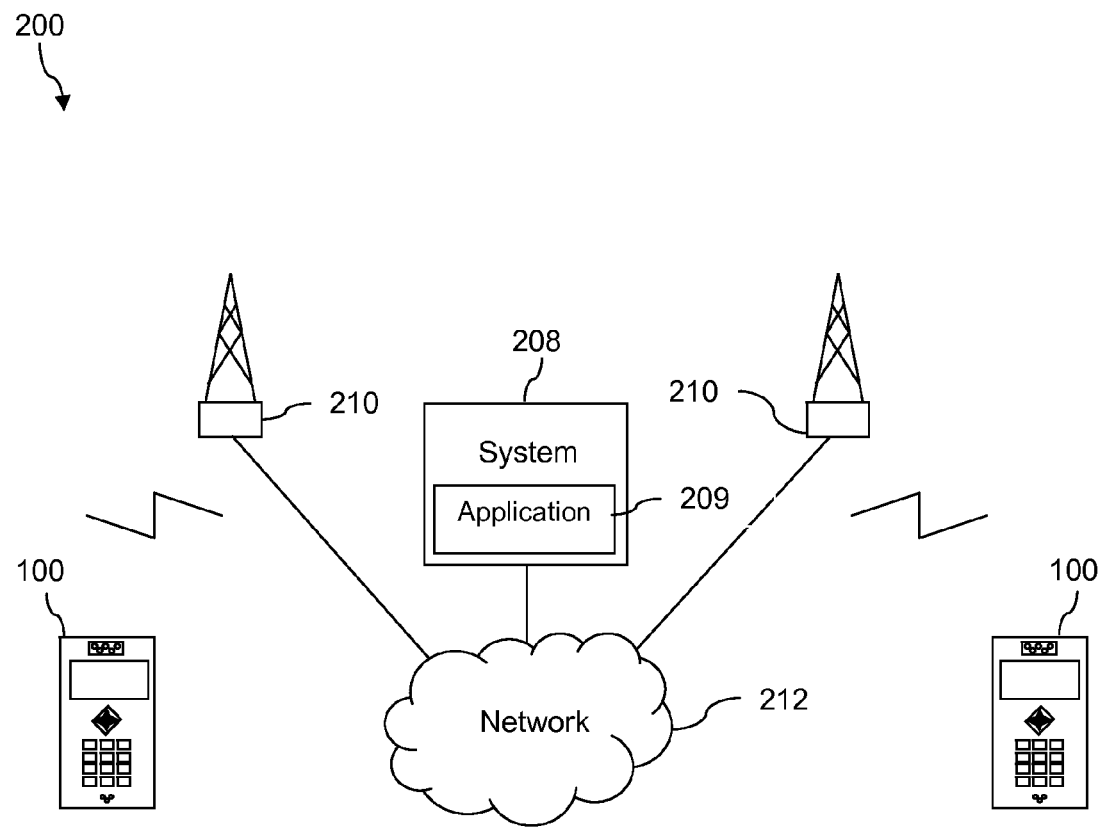
FIG. 2 illustrates a communication system, according to an embodiment of the disclosure.

FIG. 2 shows a wireless communications system 200 including the portable electronic device 100. FIG. 2 depicts the portable electronic device 100, which is operable for implementing aspects of the present disclosure, but the present disclosure should not be limited to these implementations. In FIG. 2, two portable electronic devices 100 are depicted in order to illustrate communication from one portable electronic device to another, wherein each may be the same or similar. For the purposes of this disclosure, whether the hardware and software of the two portable electronic devices 100 are identical or not, their basic functions may be considered to be the same.

Though illustrated as a mobile phone, the portable electronic device 100 may take various forms including a wireless handset, a pager, a personal digital assistant (PDA), a gaming device, an inventory control device, a media player, a portable computer, a tablet computer, a laptop computer, and/or other. Many suitable handsets combine some or all of these functions. In some embodiments of the present disclosure, the portable electronic device 100 is not a general purpose computing device like a portable, laptop or tablet computer, but rather is a special-purpose communications device such as a mobile phone, wireless handset, pager, or PDA. The portable electronic device 100 may support specialized activities such as gaming, inventory control, job control, and/or task management functions, and so on.

The portable electronic device 100 may execute a web browser application which enables the display 104 to show a web page. The web page may be obtained via wireless communications with a base transceiver station (BTS) 210, a peer portable electronic device 100 or any other wireless communication network or system. Two base transceiver stations 210 are illustrated, and it should be understood that the wireless communication system may comprise additional base transceiver stations, which may or may not comprise identical hardware, but whose functions may be considered to be the same. The portable electronic device 100 may access the base transceiver stations 210 through a peer portable electronic device 100 acting as an intermediary, in a relay type or hop type of connection. In some instances, the portable electronic device 100 may be in communication with multiple base transceiver stations 210 at the same time. The base transceiver station 210 is coupled to a network 212. The network 212 may comprise a combination of public and private networks. The network 212 may comprise both wired communication links and wireless communication links. The network 212 may comprise, in part, the Internet. Via the link to the network 212, the base transceiver stations 210 may be connected to another system, such as system 208.

The system 208 may be, for example, a server of the service provider. The system 208 may execute an application 209. The application 209, along with the system 208, may be configured to communicate information, such as information pertaining to the account of the user of the portable electronic device 100, between the service provider and the user of the portable electronic device 100. The portable electronic device 100 may access the system 208 through the network 212, through the base transceiver stations 210.

In an embodiment, a user of the portable electronic device 100 (also referred to as a customer of a wireless communication service provider, or merely as a customer) may purchase a quantity of text messages, for example 100 text messages, from a service provider that offers text messaging service. The newly-purchased text messages may be added to an existing balance in the user's text message account. If this is the first purchase for this user, or is otherwise a new or empty account, then the balance will now be 100 text messages. If, however, the user still has some number of text messages remaining in their text message account, for example 15 text messages, the new balance would be the existing balance plus the newly-purchased text messages, or 115 text messages. As the user of the portable electronic device 100 sends and/or receives subsequent text messages, the number of remaining text messages may be decremented accordingly, and will produce a new balance.

In an embodiment, the user of the portable electronic device 100 may purchase text messages as a number of text messages per period of time such as, for example a number of text messages per week, per month, per year, or other period of time. Then, as the user of the portable electronic device 100 uses or consumes the balance of the text messages, the age of the messages also may be of concern, as they may be provided on a "use by date" or other expiration scheme such that the balance may be reduced if the text messages are not used within a given timeframe. In this case, the user of the portable electronic device 100 may be notified of the time period remaining to use the available text message balance, in order to apprise the user of the portable electronic device 100 of the pending expiration of the balance or a portion of the balance of her/his account.

In an embodiment, the portable electronic device 100 may be a mobile phone, and may therefore be capable of making phone calls, as well as sending and receiving text messages. Similarly to the pre-paid text message plan described herein, the mobile phone user may have an arrangement with the service provider to prepay for minutes of mobile phone usage. For example, the mobile phone user may have an account that contains some number of minutes of mobile phone service to be consumed as the mobile phone is used for sending and/or receiving phone calls. As discussed previously herein, the service provider may bundle the mobile phone services into a service plan that provides both mobile phone minutes and text message. Also, the service provider may maintain a customer support center, in order to provide support services to customers such as help in operating their portable electronic devices 100, changing their service plans, paying their service plan bills, and/or other support services. In addition to the services listed, the service provider's customer support center may have the ability to provide customers with their current account balance, in terms of the number of remaining text messages in their pre-paid text messaging service plan, and/or the number of minutes of phone service remaining in their pre-paid phone service account. However, in an attempt to minimize the costs associated with operating the customer support center, the service provider may provide other means for customers to monitor and/or check a text message account balance that do not require the service provider to incur additional costs, or that at least reduce or minimize the service provider's costs.

In an embodiment, the service provider may arrange to provide to the customer a representation of the current balance (e.g. the number of text messages remaining) in the user's text message account, in one or more of a variety of ways. For example, the service provider may arrange to append an audio message at the end of a mobile phone call that audibly reports the current balance of mobile phone minutes and text messages remaining in the user's account. For example, the user of the portable electronic device 100 may initiate or receive a phone call. When the call is terminated, the service provider may send a message to a client installed on the portable electronic device 100. The client may monitor the call, and may make an audio announcement at the end of the call, such as, for example, "You have 234 minutes and 123 text messages remaining in your account". In this way, the service provider may keep the user of the portable electronic device 100 informed of their balance, without involving the customer support center.

In another embodiment, the service provider may arrange to provide a visual representation of the user's text message account balance. Similarly to above, the service provider may send a message to the client, which may then display a visual representation on the display 104 of the portable electronic device 100. The client may be configured to receive periodic update information regarding the customer's account from the service provider. The client may be configured to present the customer's account information on the display 104 of the customer's portable electronic device 100. The visual representation may be superimposed on the background image or idle screen of the display 104 of the portable electronic device 100. The idle screen of the display 104 may be the screen that appears on the display when the portable electronic device 100 is first turned on, when it is activated from a sleep mode, when it is in one of a variety of modes, or may be another form of screen display of the portable electronic device 100.

In addition, the client may be configured to provide an audible signal that updated account information has been received, in order to alert the user of the portable electronic device 100 that updated account information is available. The client may display or otherwise convey the customer's account information, and may also be configured to provide an audible or vibrational indication that an account update has been received in any appropriate manner that may serve the customer's needs. FIG. 1 shows an example of such a visual representation, as message 112. In this example, message 112 illustrates an account balance on display 104, that portrays the text message account balance as a fraction. The numerator (e.g. the top number) of the fraction may represent the number of text messages remaining in the user's account (or consumed from the account), and the denominator (e.g. the bottom number) of the fraction may represent the original or previous balance in the user's account, or the balance for a given time period. The original balance may be one of the starting balance of the user's account (e.g. the balance when the account was initially established), the balance when the user last added value to the account, or other form of previous or original balance representation. In an embodiment, the message may be any form of representation of the number of text messages remaining in the user's account, the number of messages consumed from the user's account, or any other presentation of the user's text message and/or phone minutes account balance. In addition, the message may contain notes to inform the user of the portable electronic device 100 of other relevant information pertaining to the account.

In yet another embodiment, the text messages purchased by the user may have an associated time limit, such that the text messages must be used within a given timeframe, or they will expire. For example, the service provider may require the user to use the purchased text messages within a fixed number of days, for example 90 days, from the date of purchase. If the end of the 90 day period is reached, and there are unused text messages in the user's account, the service provider may purge the account and delete the unused text messages. In an embodiment, the service provider may also provide an audible or visual representation of the remaining time or expiration date associated with either text messages or mobile phone minutes, in order to both keep customers informed and to minimize calls to their customer support center.

In an embodiment, the method by which the service provider communicates account information with a customer may vary. The service provider may send a daily text message to a customer, apprising the customer of their current balance. Alternatively, the service provider may display the customer's account balance on the customer's portable electronic device 100 whenever the customer enters the texting mode of the portable electronic device 100. The service provider may arrange that the customer may send a text message to the service provider, requesting a current balance. The service provider may then convey the current balance information to the customer with a text message containing the requested account balance information. Alternatively, the portable electronic device 100 or the client may store the number of remaining available pre-paid text messages and permit the user to check the balance by, for example, pressing a key or combination of keys of the keypad 108, or by otherwise requesting a display of the current balance.

In an embodiment, the service provider may allow the customer to request her/his account balance via text message request, and may choose not to require that the customer use any of their text message credits for sending/receiving of the account update text messages. This "free" service may be offered as a value-added service by the service provider, and thereby may allow the service provider a means by which to distinguish itself from its competitors.

The customer may be provided with the opportunity to configure the client to retrieve update information at a specific interval of the customer's choosing. For example, the application may have user-configurable settings that permit the customer to request an update at an interval of once a day, twice a day, four times a day, about once every two hours, about once every four hours, or any other timeframe selectable by the customer. Alternatively, the client may be configured to provide updated information at an interval, for example, every five text messages sent or received, every ten text messages sent or received, or other interval. In an embodiment, any/all of the methods and periods of notification may be user-configurable, and thereby may provide the user with the ability to setup his/her system to best suit their preferences and needs. This flexibility may provide the service provider another means of distinguishing itself from its competitors.

In still another embodiment, the service provider may arrange to append account update information into a customer's incoming text message. While SMS text messages are limited to 160 characters, some text messages may be shorter than this. Therefore, extra space within text messages may be available, into which the service provider may imbed account information. For example, when a customer receives an incoming text message, the service provider may append a short message into the end of the text message containing the number of text messages the customer has left in his/her account. For example, an incoming text message may be amended to have verbiage at the end that says, for instance, "You have 345 text messages left in your account", or such. Alternatively, an incoming text message may be amended to provide a symbolic representation at the end that says, for instance "(345/500)" or some other distinctive format that is readily distinguished from the content of the incoming text message.

In an embodiment, the service provider may append additional account update information into a customer's incoming text message, including phone minutes remaining in the customer's account, expiration information about text messages and/or minutes remaining in the customer's pre-paid phone service account, and/or any other information the service provider deems appropriate. In an embodiment, the appended message may be presented in a distinct format, hue, or color that is readily distinguishable from the body of the text message, so that the user of the portable electronic device 100 may be aware that it is separate from the text message, itself.

In an embodiment, the service provider may give the customer the ability to request the specific information that the service provider sends. In this manner, the customer may be able to configure their notifications to suit their particular needs or desires. For example, the customer may wish to receive account balance information for their pre-paid text message account at one interval, for example daily, and they may prefer to receive the account balance in their pre-paid phone message account at a different interval, for example weekly. The customer may also be able to configure the notification method that alerts them that the updated account information has been received. For example, the customer may configure their notification to alert them with an audible tone when a pre-paid phone account update is received, and a vibrating indication when a pre-paid text message account update is received. In an embodiment, the service provider may provide the customer with the option of configuring their account balance notifications in any manner, in order to better serve their customer and to provide yet another way to distinguish their service from that of their competitors.

In still another embodiment, the account balance may be presented in a graphical form. For example, the account balance may be presented as an icon, such that the icon conveys the notion of a sort of reservoir. In other words, in a manner akin to the common battery icon that may appear on the display of some forms of portable electronic device, wherein the battery charge level is portrayed as being full, three quarters full, half full, one quarter full, or such. In a likewise manner, the account balance may be represented as being full, or other portion of full by way of a graphic icon or image that effectively portrays the quantity of text messages remaining in or consumed from the pre-paid text message account. In another example, the account may be represented as a gauge, much along the lines of a gas gauge in an automobile. Similar to the graphic icon or image described above, the gauge may indicate full, three quarters full, half full, one quarter full, empty, or similar incremental or absolute representations of the balance of the account.

In other embodiments, the account information may be provided to the customer by the service provider in any form or fashion. Instead of conveying account balance information in terms of the actual number of text messages and/or pre-paid phone minutes remaining, the information may be provided in terms of the fraction of the account that has been consumed or the amount of the account that remains. For example, the customer may be informed that there is one half of the account balance left, one fourth of the account balance left, one eighth of the account balance left, and so on. Alternatively, the account information may be conveyed in terms of the fraction of the account that has been consumed. For example, one forth of the account has been used, one half of the account has been used, three fourths of the account has been used, and so on.

In an embodiment, the pre-paid account may comprise units of text messaging credit, units of phone communication minutes, units of email credit, units of minutes of internet access, units of amounts of data of internet access such as bytes, kilobytes, megabytes, or other units of internet access, or other credit for any form of communication or service for a portable electronic device 100. One of ordinary skill in the art may envision additional form or formats for conveying information regarding any of the customer's account balances and the related balance therein.

Figure 3:
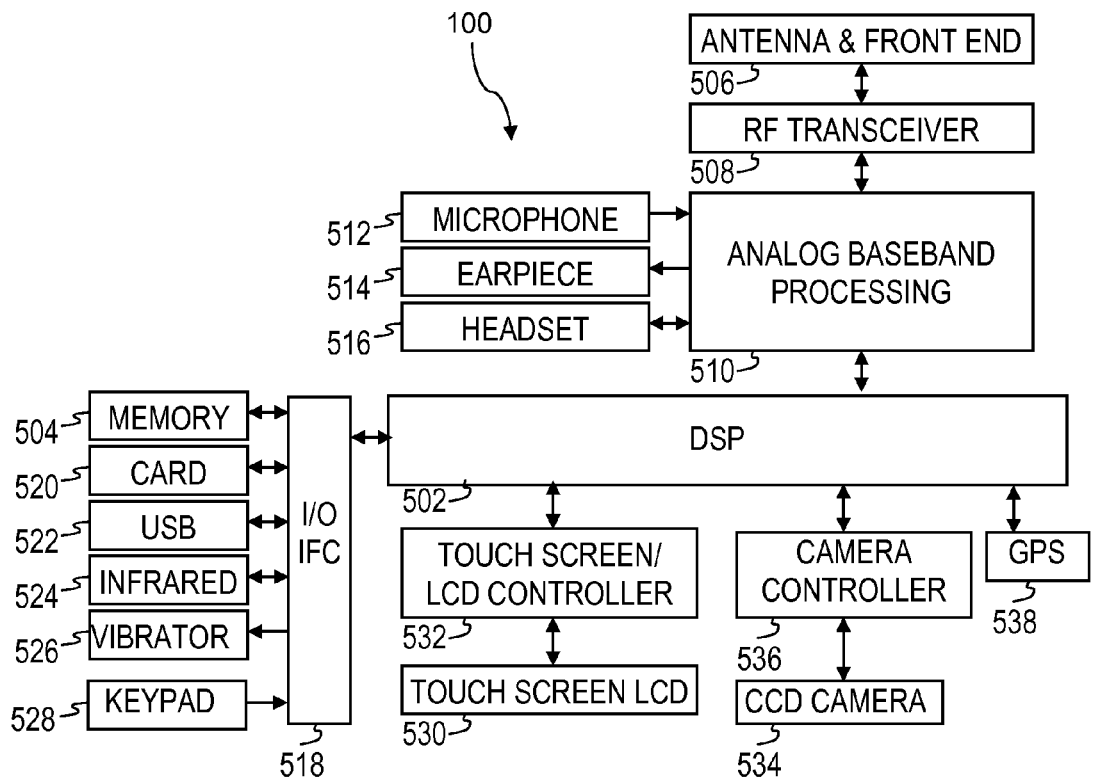
FIG. 3 is a block diagram of a portable electronic device, according to an embodiment of the disclosure.

FIG. 3 shows a block diagram of the portable electronic device 100. While a variety of known components of portable electronic devices 100 are depicted, in an embodiment a subset of the listed components and/or additional components not listed may be included in the portable electronic device 100. The portable electronic device 100 includes a digital signal processor (DSP) 502 and a memory 504. As shown, the portable electronic device 100 may further include an antenna and front end unit 506, a radio frequency (RF) transceiver 508, an analog baseband processing unit 510, a microphone 512, an earpiece 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable electronic device 100 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the portable electronic device 100 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the portable electronic device 100 to send and receive information from a radio access network (RAN) or some other available wireless communications network or from a peer portable electronic device 100. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the portable electronic device 100 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the portable electronic device 100 to function as a peripheral device to exchange information with a personal computer or other computer system. The infrared port 524 and other optional ports such as a Bluetooth interface or an IEEE 802.11 compliant wireless interface may enable the portable electronic device 100 to communicate wirelessly with other nearby handsets and/or wireless base stations.

The input/output interface 518 may further connect the DSP 502 to the vibrator 526 that, when triggered, causes the portable electronic device 100 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the portable electronic device 100. Another input mechanism may be the touch screen LCD 530, which may also display text and/or graphics to the user. The touch screen LCD controller 532 couples the DSP 502 to the touch screen LCD 530.

The CCD camera 534 enables the portable electronic device 100 to take digital pictures. The DSP 502 communicates with the CCD camera 534 via the camera controller 536. The GPS sensor 538 is coupled to the DSP 502 to decode global positioning system signals, thereby enabling the portable electronic device 100 to determine its position. In another embodiment, a camera operating according to a technology other than charge coupled device cameras may be employed. Various other peripherals may also be included to provide additional functions, e.g., radio and television reception.

Figure 4:
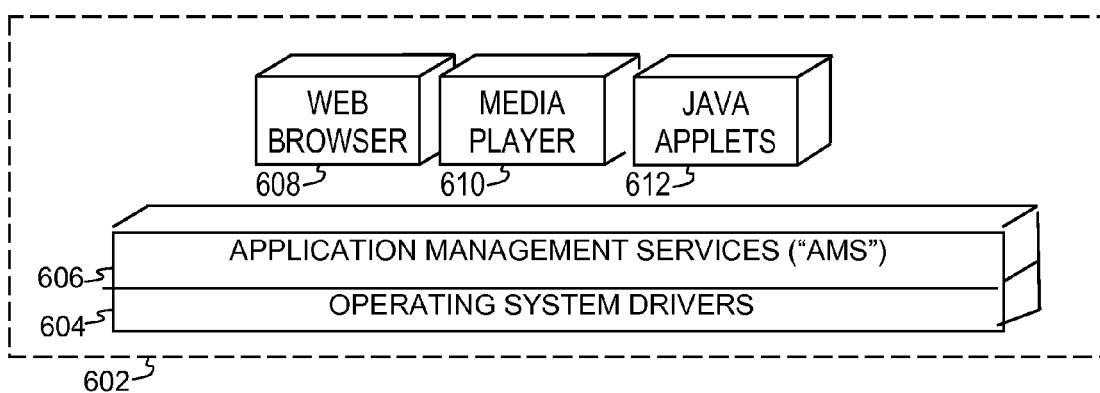
FIG. 4 is a block diagram of software architecture of a portable electronic device, according to an embodiment of the disclosure.

FIG. 4 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the portable electronic device 100. Also shown in FIG. 4 are a web browser application 608, a media player application 610, and JAVA applets 612. The web browser application 608 configures the portable electronic device 100 to operate as a web browser, allowing a user to enter information into forms and select links to retrieve and view web pages. The media player application 610 configures the portable electronic device 100 to retrieve and play audio or audiovisual media. The JAVA applets 612 configure the portable electronic device 100 to provide games, utilities, and other functionality.

Figure 5:
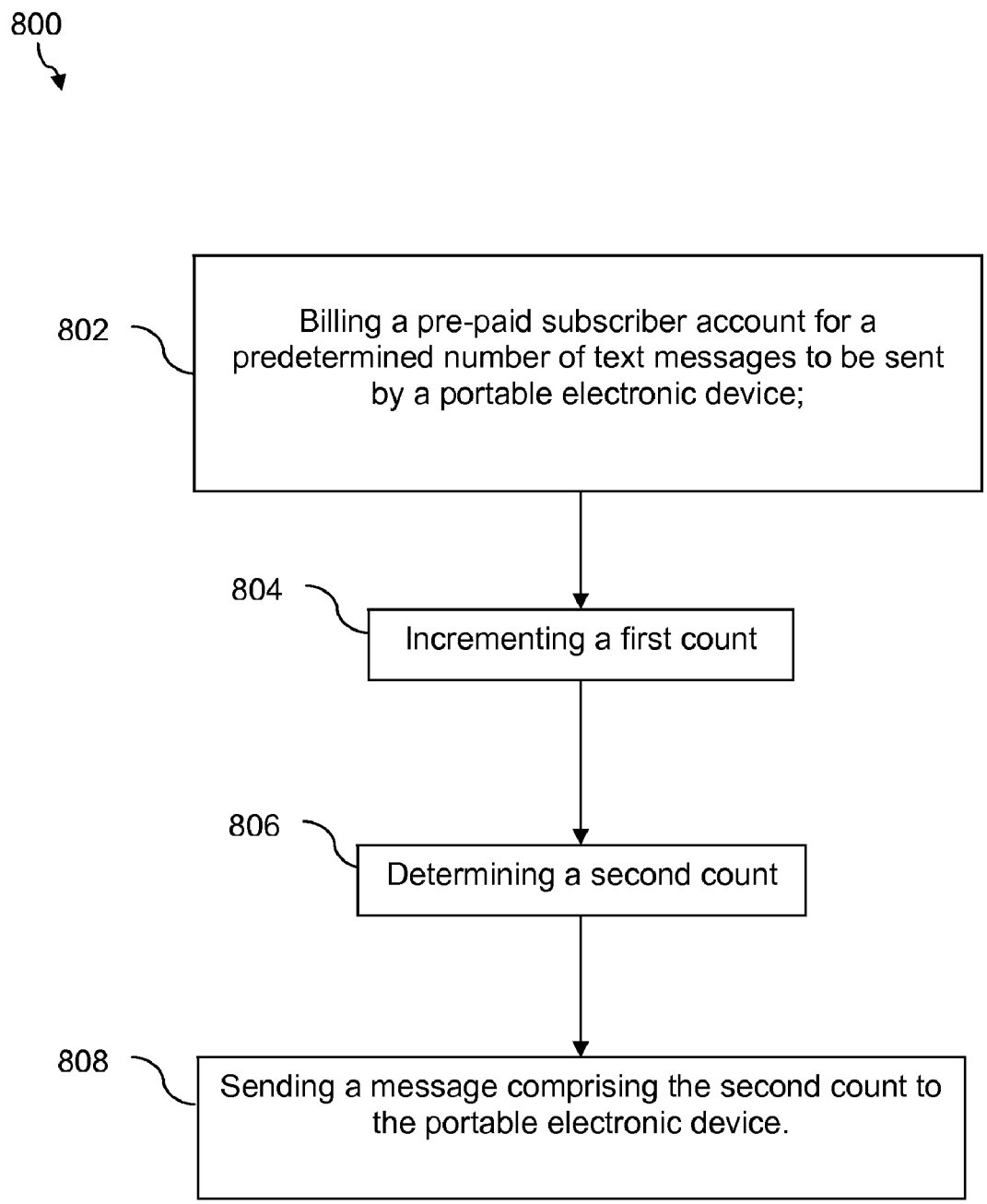
FIG. 5 is a flowchart, according to an embodiment of the disclosure.

Now turning to FIG. 5, a flowchart 800 of an embodiment of the disclosure is illustrated. In step 802, the pre-paid subscriber account of a user of a portable electronic device 100 is billed for a predetermined number of text messages to be sent from the portable electronic device 100. The purchased text messages are added to the user's account and in step 804, the current balance of the account is incremented by the number of text messages purchased, thereby determining a first count. The user of the portable electronic device 100 then may send and receive text messages, drawing on the available text message balance in her/his account. As the available number of text messages is used by sending/receiving text messages, the first count is decremented appropriately. In step 806, a second count representing the remaining balance in the text message account is determined. The second count is based on both how many text messages have been sent and received by the portable electronic device 100. In step 808, a message comprising the second count is sent from the application 209 of the system 208, to the client of the portable electronic device 100. In an embodiment, the message may further comprise the first count also. The client of the portable electronic device 100 may then present the second count in an appropriate manner as described previously herein.

Figure 6:
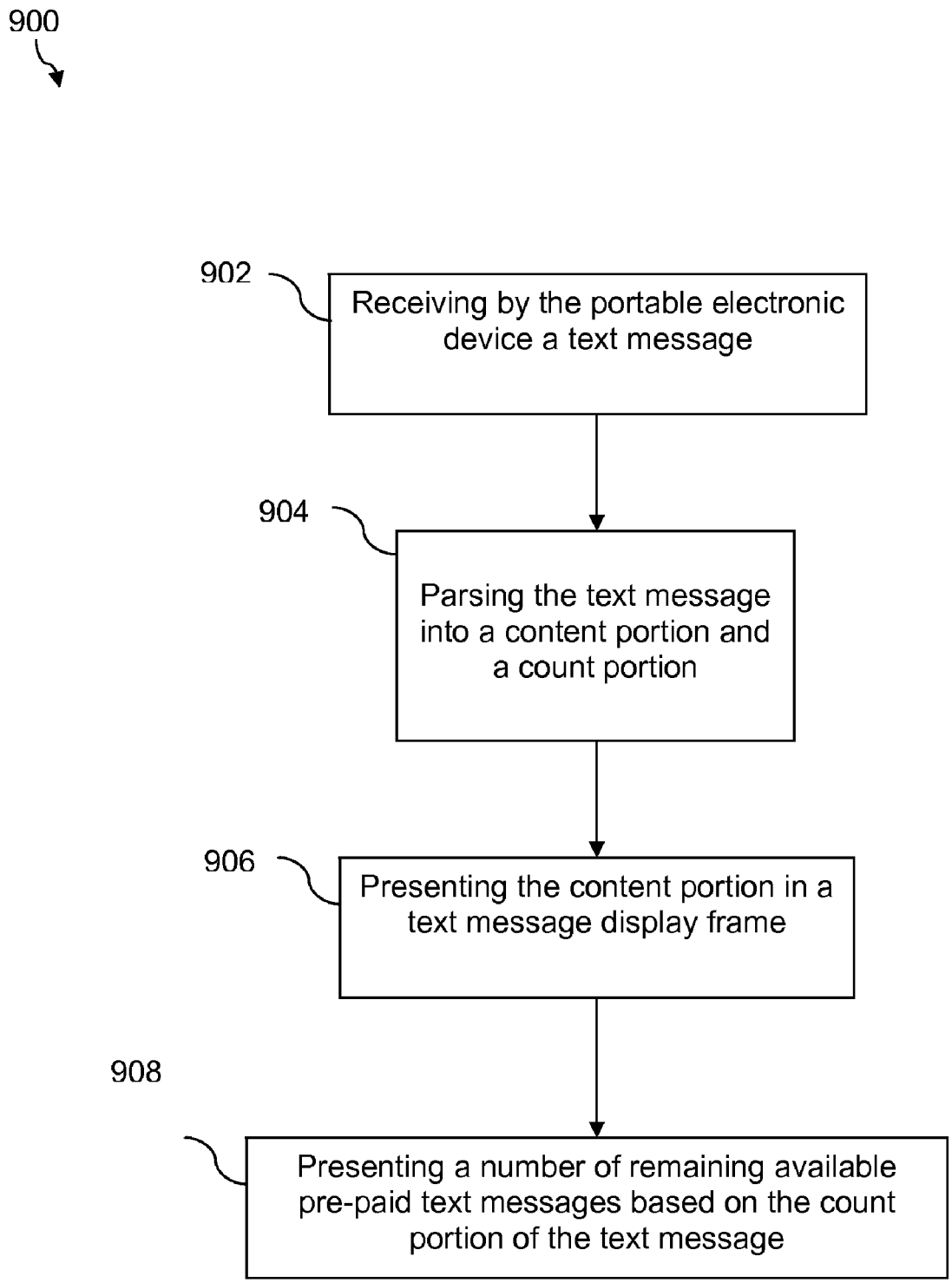
FIG. 6 is a flowchart, according to an embodiment of the disclosure.

FIG. 6 illustrates a flowchart 900 of an embodiment of the present disclosure. In step 902, the portable electronic device 100 receives a text message. In step 904, the text message is parsed into a content portion and a count portion. The parsing may be conducted by the client of the portable electronic device 100. In step 906, the content portion of the message is presented in a text message display frame on the display 104 of the portable electronic device 100. Then, in step 908, the client presents the number of remaining available pre-paid text messages, based on the count portion of the text message, on the portable electronic device 100.

Figure 7:
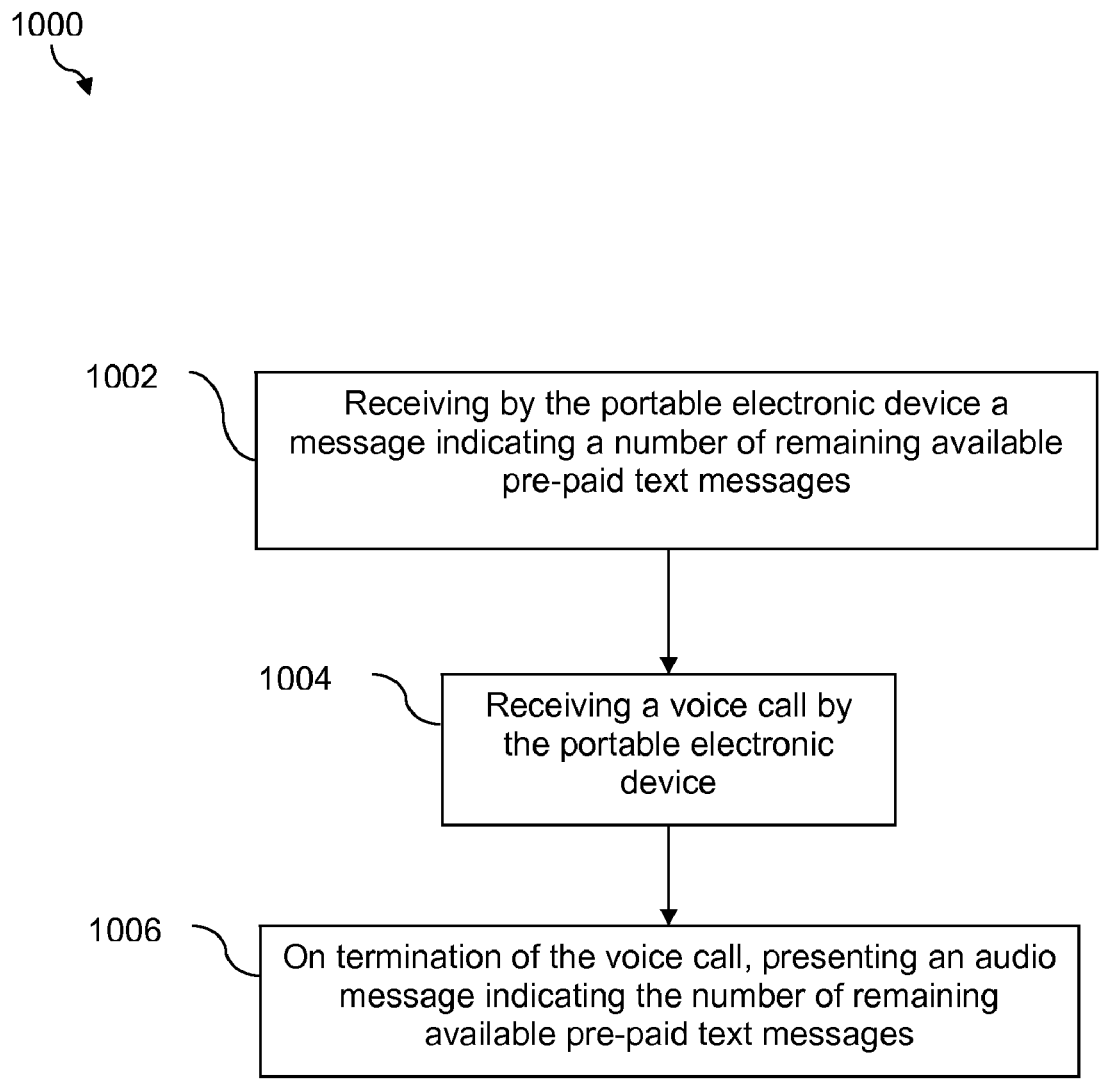
FIG. 7 is a flowchart, according to an embodiment of the disclosure.

In FIG. 7, a flowchart 1000 of an embodiment of the present disclosure is illustrated. In step 1002, the portable electronic device 100 receives a message indicating the number of remaining available pre-paid text messages in a pre-paid text message account. In an embodiment, the message of block 1002 may be a text message or other type of short message. In step 1004, the portable electronic device 100 receives a voice call, for example, a phone call. Then, in step 1006, upon termination of the voice call, an audio message indicating the number of remaining available pre-paid text messages in the account is presented on the portable electronic device 100.

Figure 8:
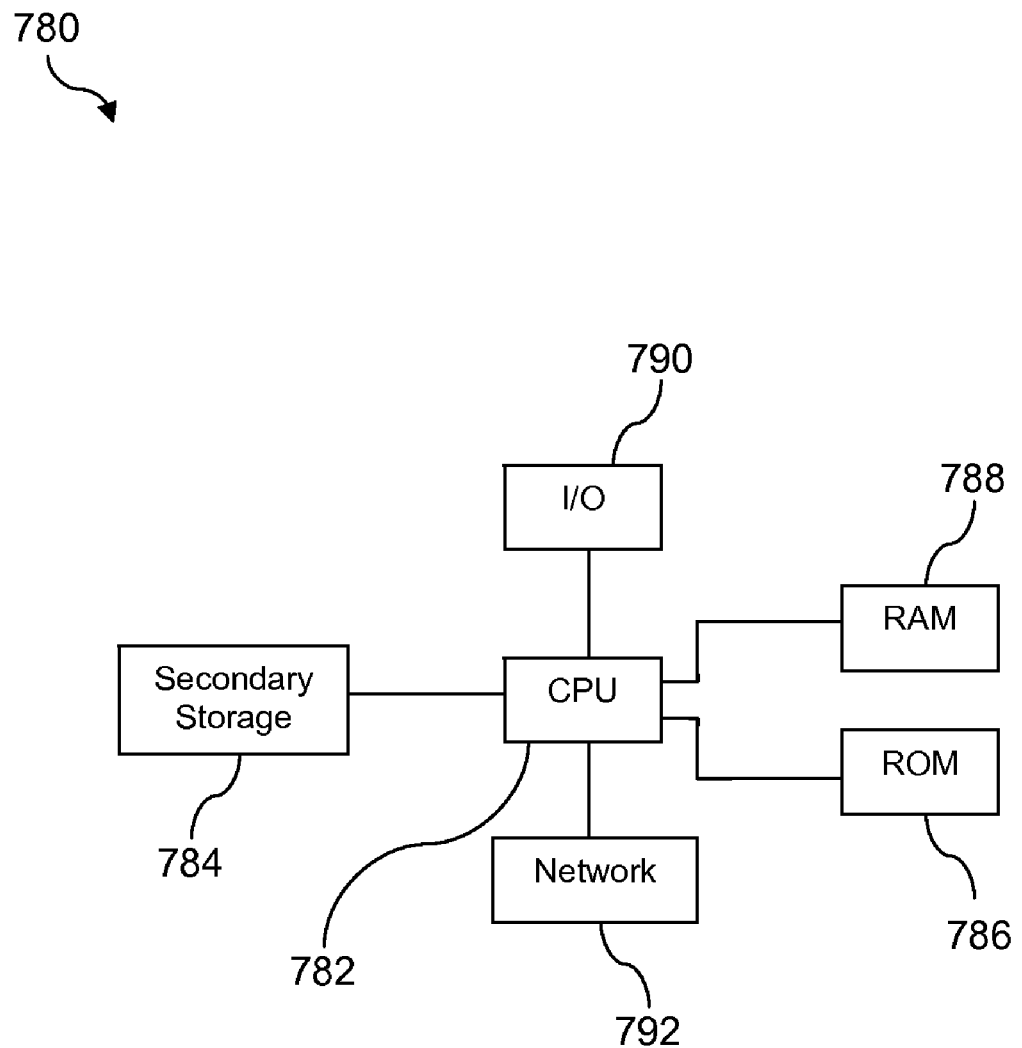
FIG. 8 illustrates an exemplary computer system, according to an embodiment of the disclosure.

FIG. 8 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of presenting on a portable electronic device a number of remaining available pre-paid text messages, comprising:
   receiving a user defined interval at which to notify the user of a number of pre-paid text messages remaining, wherein the user defined interval is defined by at least one of a number of pre-paid text messages sent and a period of time;
   receiving by the portable electronic device a pre-paid text message;
   parsing the pre-paid text message into a content portion and a count portion;
   presenting the content portion in a text message display frame; and
   presenting the number of remaining available pre-paid text messages based on the count portion of the pre-paid text message at the user defined interval, wherein presenting the number of remaining available pre-paid text messages comprises displaying the number of remaining available pre-paid text messages as an appended message when displaying the pre-paid text message.

2. The method of claim 1, wherein the portable electronic device is one of a mobile phone, a personal digital assistant, and a media player.

3. The method of claim 1, further comprising determining a remaining life span of unused text messages, wherein a message sent to the portable electronic device comprises the remaining life span.

4. The method of claim 1, further comprising determining a number of remaining days before an expiration date of the remaining pre-paid text messages, and sending a message to the portable electronic device indicating the number of remaining days before the expiration date.

* * * * *